(12) United States Patent
Arnstein

(10) Patent No.: US 8,291,325 B2
(45) Date of Patent: Oct. 16, 2012

(54) LOCATION SPECIFIC DISPLAY OF INFORMATION RESOURCES ON A HOST INTERFACE

(76) Inventor: Pheibush Philippe Arnstein, Ramat Beit Shemesh (IL)

( * ) Notice: Subject to any disclaimer, the term of this patent is extended or adjusted under 35 U.S.C. 154(b) by 205 days.

(21) Appl. No.: 12/888,623

(22) Filed: Sep. 23, 2010

(65) Prior Publication Data

US 2011/0072357 A1 Mar. 24, 2011

Related U.S. Application Data

(60) Provisional application No. 61/245,285, filed on Sep. 24, 2009.

(51) Int. Cl.
*G06F 3/01* (2006.01)
(52) U.S. Cl. ......... 715/738; 715/748
(58) Field of Classification Search .......... 715/738, 715/748
See application file for complete search history.

(56) References Cited

U.S. PATENT DOCUMENTS

| | | | |
|---|---|---|---|
| 2002/0054052 | A1 | 5/2002 | Sharma et al. |
| 2003/0090510 | A1 | 5/2003 | Shuping et al. |
| 2005/0235220 | A1 | 10/2005 | Duperrouzel et al. |
| 2006/0224951 | A1 | 10/2006 | Burke et al. |

FOREIGN PATENT DOCUMENTS

WO WO2006127480 A2 11/2006

*Primary Examiner* — Mark Rinehart
*Assistant Examiner* — Meseker Takele
(74) *Attorney, Agent, or Firm* — Ash Tankha; Lipton, Weinberger & Husick

(57) ABSTRACT

A computer implemented method and system is provided for displaying information resources linked from a host interface on selected locations on the host interface. A processing element is defined for a link referenced in the host interface. The processing element determines an address of an information resource referenced by the link. An area representation element specifies locations for displaying the information resource on the host interface. A display element is defined for displaying content of the information resource on the host interface and is linked to the processing element and the area representation element. The linked display element retrieves the address of the information resource from the processing element and retrieves the location selected by the user from the area representation element. The linked display element retrieves content of the information resource from the retrieved address and displays the retrieved content in the selected location on the host interface.

25 Claims, 15 Drawing Sheets

LOCATION SPECIFIC DISPLAY OF INFORMATION RESOURCES ON A HOST INTERFACE

CROSS REFERENCE TO RELATED APPLICATIONS

This application claims the benefit of provisional patent application No. 61/245,285 titled "Location Specific Display Of Information Resources On A Host Interface", filed on Sep. 24, 2009 in the United States Patent and Trademark Office.

The specification of the above referenced patent application is incorporated herein by reference in its entirety.

BACKGROUND

The computer implemented method and system disclosed herein, in general, relates to displaying information resources. More particularly, the computer implemented method and system disclosed herein relates to displaying multiple information resources on a host interface in locations selected by a user.

The world wide web allows users to navigate to new web pages using links via a web browser application. The links are coded and each link comprises a web page address. The coding of the links allows the web browser application to navigate to the web pages upon clicking the link. Current web browser applications allow the users to display content of one or more web pages by invoking multiple independent web browser windows, or by displaying the content of one or more web pages in different tabs in the same web browser window that the link is in, or by displaying the content of only one web page in the same web browser window that the link is in. Consequently, if the user wants to view multiple web pages, the user has to continually switch back and forth between various browser windows or tabs. The methods provided by the current web browser applications for displaying multiple web pages are therefore inconvenient and slow.

When a user performs a web search, the user receives a host web page. The host web page typically displays a list of the names of the web pages found and the addresses of the web pages found. The addresses of the web pages found typically are hypertext linked to the respective web pages. In order to access the web pages, the user selects one or more of the web addresses, for example, by clicking on the link to a desired web page using a computer mouse. The action of clicking on the link with the computer mouse results in displaying content of only one web page at a time on the same web page that the link is in. Consequently, the user has to check the content of the displayed web page. If the displayed web page is not the web page the user is looking for, the user has to reload the search results page and click on another link to display the content of another web page. There is a need to allow a user to view and compare the contents of several web pages at the same time. Most often, a user displays multiple web pages in separate tabs. The tabbed browsing method necessitates the user to continually switch back and forth between multiple tabs.

Moreover, current file browser applications allow a user to display the content of a single document within a single window of an operating system. The user has to invoke multiple independent windows to display the content of multiple documents of information. Consequently, if the user wishes to view multiple information documents, the user has to continually switch back and forth between various windows. Furthermore, the user cannot select where on a window or a web page a selected information resource such as a web page or a document will open, necessitating manual placing and usually manual resizing of the various windows to obtain the required setup.

Hence, there is a long felt but unresolved need for a computer implemented method and system that displays one or more information resources linked from a host interface on locations selected by a user to allow the user to view multiple information resources on the host interface in the selected locations, without having to navigate away from the host interface.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for displaying one or more of multiple information resources linked from a host interface on locations selected by a user on the host interface. The computer implemented method and system disclosed herein allows the user to view multiple information resources on the host interface in locations selected by the user without having to navigate away from the host interface. In addition, the computer implemented method and system allows the user to control, view, and interact with multiple information resources within the host interface, thereby allowing the user to simultaneously access and compare more information from different information resources in a quicker manner.

In the computer implemented method and system disclosed herein, the host interface is accessible by the user, for example, via a computing device of the user or a network. The host interface is implemented, for example, on a browser application or a computer window application. The host interface is, for example, a host window, a host web page, a graphical user interface displayed on a browser application, etc. A processing element is defined for a link to one of the information resources referenced in the host interface. In an embodiment, a link referencing an information resource is associated with the processing element, for example, by manually entering the link into the processing element by the user or by transferring the link into the processing element by the user. The processing element determines an address, for example, a file address, a web address, a directory address, etc. of the information resource referenced by the link accessible via the host interface. The link referencing the information resource is rendered with the processing element to the user. In an embodiment, a link referencing the information resource is represented as a menu item selectable by the user for displaying the information resource corresponding to the menu item in a selected location on the host interface.

An area representation element is defined for specifying locations on the host interface for displaying the information resource on the host interface. The area representation element renders the specified locations for display of the information resource referenced by the rendered link to the user. The user selects one of the specified locations for the display of the information resource corresponding to the rendered link on the host interface. In an embodiment, the area representation element stores a set of locations preselected by the user for displaying the information resources on the host interface. The area representation element renders available locations and/or the preselected set of locations to the user for the selection. The user selects one of the rendered locations for displaying the information resource on the host interface.

A display element is defined for displaying content of the information resource on the host interface. The display element is linked to the processing element for retrieving the address of the information resource. The display element is linked to the area representation element for retrieving the selected location. The linked display element retrieves the content of the information resource from the retrieved address. The linked display element displays the retrieved content of the information resource in the selected location on the host interface. The user can therefore view the information resource on the host interface in a location specified by the user.

In an embodiment, the linked display element provides options to display or hide the specified locations on the host interface. In another embodiment, the linked display element provides options to display or hide the specified locations on the host interface prior to activation of the processing element. In another embodiment, the linked display element provides options to display or hide the retrieved content in the selected location on the host interface. In another embodiment, the linked display element provides options to display content retrieved from multiple addresses in the selected location on the host interface. In another embodiment, the retrieved content of the information resource is displayed in the selected location on the host interface, for example, by manually entering the link in a predefined location on the host interface, activating the rendered link via an input from the user, or transferring the rendered link referencing the information resource to the display element.

In an embodiment, the area representation element provides options to select characteristics, for example, dimensions, appearance such as color, audio elements, etc. for the display of an information resource on the host interface. The characteristics are associated with the locations selected by the user. The user customizes the graphical representation of the selected location by selecting values for the characteristics of the selected location. The area representation element specifies the locations based on the selected characteristics. The linked display element displays the retrieved content of the information resource in the selected location on the host interface based on the selected characteristics.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
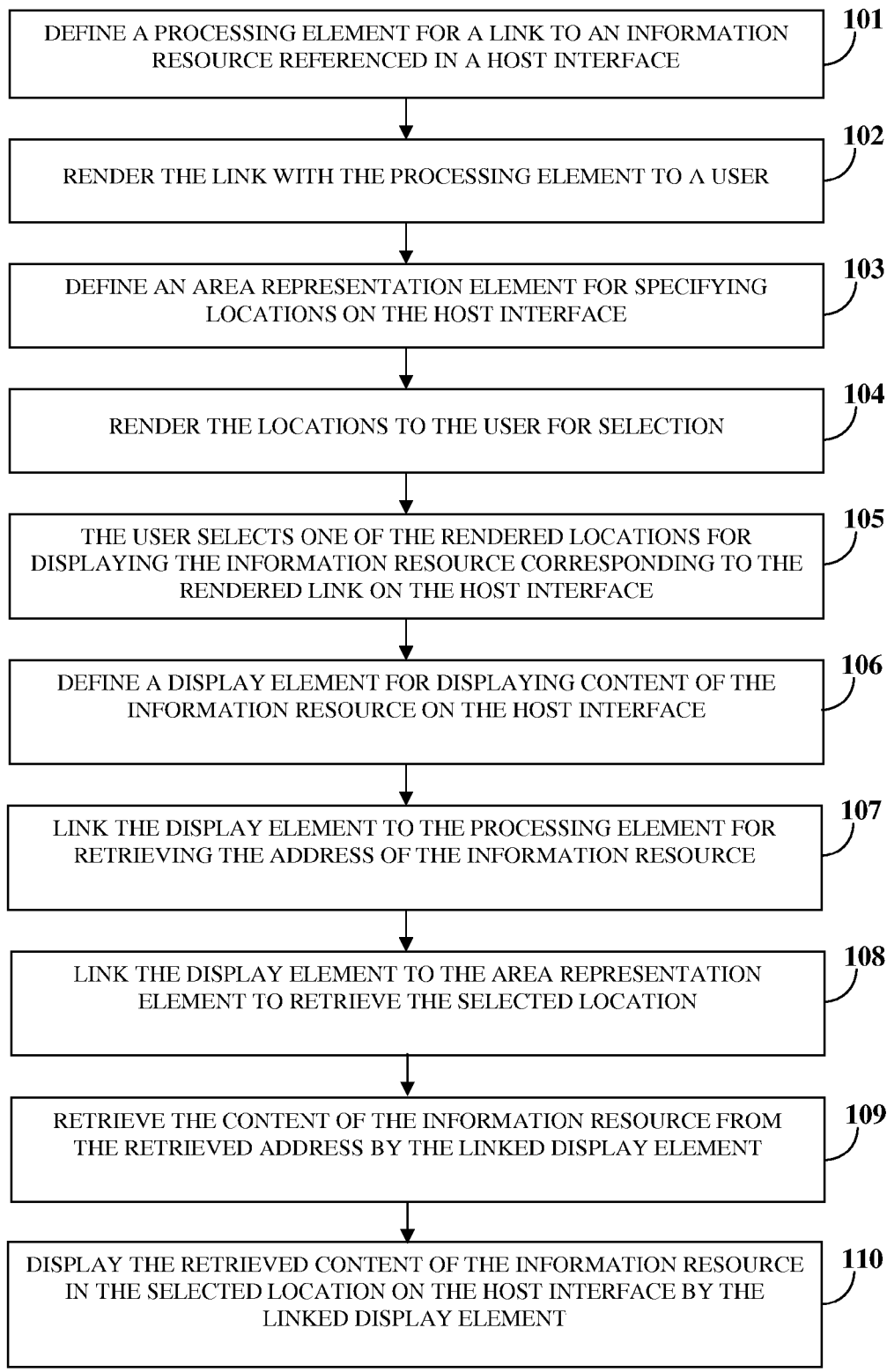
FIG. 1 illustrates a computer implemented method for displaying one or more information resources linked from a host interface on selected locations on the host interface.

FIG. 1 illustrates a computer implemented method for displaying one or more information resources linked from a host interface on selected locations on the host interface. The information resources are, for example, web pages, text files, word processing electronic documents, image files, video files, etc. As used herein, the term "host interface" refers to an interaction display area between a user and a computing device, for example, a personal computer, a laptop, a tablet computer, a mobile phone, etc., that allows the user to display multiple information resources in selected locations on the host interface. The host interface is accessible by a user via a computing device of the user or a network. The user accesses the host interface via a computing device, for example, a cellular phone, a desktop computer, a notebook computer, a tablet computer, an internet-enabled mobile device, a personal digital assistant, etc. The host interface is, for example, a host computer window, a host web page, etc. The host interface is implemented, for example, on a browser application or a computer window application. The browser application is, for example, a web browser such as Internet Explorer® of Microsoft Corporation, Firefox® of Mozilla Corporation, etc. that retrieves, displays, and allows exchange of content and resources on the world wide web. The computer window application is a visual area on the display unit of the user's computing device containing a user interface. The computer window application allows an input to one or more processes of the computing device and displays output. In the computer implemented method disclosed herein, a processing element is defined 101 for a link to one of the information resources referenced in the host interface. As used herein, the term "processing element" refers to a software component capable of processing a link and determining an address encoded in the link. Also, as used herein, the term "link" refers to a pointer that directs a user from one information resource to another information resource or from one interface to another on the host interface. The link is, for example, a hyperlink, a hard link, a symbolic link, etc. In an embodiment, a link referencing an information resource is associated with the processing element by transferring the link to the processing element. For example, the user highlights a link referencing an information resource. The user then drags and drops the link into the processing element via an input device such as a computer mouse. Furthermore, the user can manually enter the link referencing the information resource into the processing element. For example, the processing element is configured as a text box that accepts text input. The user types the link referencing the information resource into the text box. The processing element processes the link entered in the text box. The processing element determines the address of the information resource referenced by the link. As used herein, the term "address" refers to a web address, a file address, a directory address, etc. that specifies the location of an information resource accessible via the host interface. For example, the processing element determines a file address of a link to a file in a folder on the user's computing device or a web address of a web link to a web page.

The link referencing the information resource is rendered 102 with the processing element to the user on the host interface. The user accesses the information resource at the address on the host interface, across a network such as the internet, a local area network or a wide area network, or on the user's computing device via a user input. In an example, the link references an information resource residing on a server accessible over the internet. The user clicks on the link and the processing element determines the address referenced by the link. In this case, the processing element accesses the information resource located at the address over the internet.

In an embodiment, the processing element also specifies locations available on the host interface for displaying the information resource on the host interface. In another embodiment, an area representation element is defined 103 for specifying locations on the host interface for displaying the information resource on the host interface. As used herein, the term "area representation element" refers to a software component capable of specifying a list of available locations for displaying an information resource and for accepting an input from the user regarding the selection of a location from the list of available locations. For example, the area representation element aggregates all the empty spaces on the host interface into a list of available locations. In an embodiment, the user preselects a set of locations for displaying the information resources on the host interface. The area representation element adds the preselected set of locations to the list of available locations. The area representation element renders 104 the list of available locations along with the preselected set of locations for display of the information resource referenced by the rendered link to the user for selection. The user selects 105 one of the rendered locations for displaying the information resource corresponding to the rendered link on the host interface.

In an embodiment, the user selects characteristics for the display of the information resource corresponding to the rendered link on the host interface. The characteristics are associated with the available locations and the locations selected by the user. The characteristics comprise, for example, dimensions such as size, appearance such as color, audio elements, etc. for the locations on the host interface. In an embodiment, the user selects the characteristics along with the locations. For example, the user selects the size of the location by selecting the height and width of the selected location. The user also selects the background color for the selected location. The area representation element specifies the locations on the host interface based on the selected characteristics.

A display element is defined 106 for displaying content of the information resource on the host interface. As used herein, the term "display element" refers to a software component capable of retrieving content of an information resource based on the address of the information resource and displaying the retrieved content in a selected location. A display element is, for example, an inline frame (iframe) defined for displaying content of the information resource on the host interface. The iframe is a hypertext markup language (HTML) element that allows an information resource to incorporate the content of another information resource. The HTML element is used to insert content from another source, for example, an advertisement, into a web page. The iframe is programmed to display the content of the information resource in locations selected by the user. The programming of the iframe for displaying the content of the information resource in a location selected by the user is performed, for example, by specifying the position parameters for the iframe in the "style" attribute. HTML attributes define desired behavior of the HTML element or indicate additional HTML element properties. The style attribute specifies an inline style for the HTML element. When the address of the information resource and the location selected by the user determined by the processing element and/or the area representation element are rendered to the iframe, a source code (SRC) attribute in the iframe is altered by the processing element and/or the area representation element. The SRC attribute specifies the target location for the content of the information resource. The altering of the SRC attribute facilitates the display of the content of the information resource in the location selected by the user.

The display element is linked 107 to the processing element for retrieving the address of the information resource. The display element is linked 108 to the area representation element for retrieving the location selected by the user. The linked display element retrieves 109 the content of the information resource from the retrieved address. The linked display element displays 110 the retrieved content of the information resource in the selected location on the host interface. In an embodiment, the computer implemented method disclosed herein provides options to display content retrieved from multiple addresses in a single selected location on the host interface. The user views one or more of the information resources on the host interface in the locations selected by the user.

In an embodiment, the linked display element displays the retrieved content of the information resource in locations preselected by the user. In another embodiment, the linked display element displays the retrieved content of the information resource in the selected location on the host interface based on the characteristics selected by the user. In another embodiment, the retrieved content of the information resource is displayed in the selected location on the host interface, for example, by manually entering the link in a predefined location on the host interface, by activating the rendered link via an input from the user, by transferring the rendered link referencing the information resource to the display element, etc.

For purposes of illustration, the detailed description refers to a single processing element, a single area representation element, and a single display element on a host interface; however the scope of the computer implemented method and system disclosed herein is not limited to a single processing element, a single area representation element, and a single display element but may be extended to include multiple processing elements, area representation elements, and display elements on the host interface.

In an embodiment, multiple processing elements are provided on the host interface for referencing a list of menu items. A link referencing an information resource is represented as a menu item selectable by the user for displaying the information resource corresponding to the menu item in the selected location on the host interface. The menu items in the list represent addresses corresponding to information resources. The user selects one or more menu items from the list. The area representation element specifies the locations for displaying the content of the information resources. The user then selects one of the specified locations for displaying the content of the corresponding information resource. The processing element determines the addresses of the information resources referenced by the menu items selected by the user. The determined addresses of the information resources and the locations selected by the user for displaying the content of the information resources are rendered to the display element. The display element retrieves the content of the information resources from the rendered addresses and displays the retrieved content in the locations selected by the user on the host interface.

In another embodiment, the association of the processing element with a specific address may be created by the user, for example, by enabling the user to drag and drop a link corresponding to an information resource into the processing element. Alternatively, the user manually types a link corresponding to the information resource into the processing element. The processing element determines the address of the information resource referenced by the link. The area representation element specifies available locations for displaying the information resource. The user selects one of the specified locations. The determined address and the selected location are rendered to the display element. The display element retrieves the content of the information resource from the determined address and displays the retrieved content in the location selected by the user on the host interface.

In another embodiment, the user manually enters the link into a location on the display element or the user transfers or drags and drops a link referencing the information resource into a location on the display element. The processing element determines the address from the user entered link. The display element linked to the processing element retrieves the content from the determined address and displays the retrieved content in the location where the link was manually entered or dragged and dropped.

In yet another embodiment, the processing element creates an associated display element. The associated display element is created by the processing element after the processing element has determined an address of an information resource. The creation of the associated display element alleviates the need for a pre-existing display element. Furthermore, this embodiment facilitates hiding the display element or making the display element invisible until the processing element is activated. In this embodiment, a show window element is defined for allowing the user to hide the display element or show the display element. The embodiment also provides options to show or hide the display element after the display element displays the retrieved content in the location selected by the user. Consider an example where multiple web pages are displayed on the host web page and the user wishes to hide one or more of the displayed web pages without deleting the displayed web pages. The defined show window element allows the user to hide one or more of the displayed web pages and display the hidden web pages when the user wishes to view the hidden web pages. In another embodiment, the show window element provides options to show or hide retrieved content in the selected location on the host interface.

Figure 2:
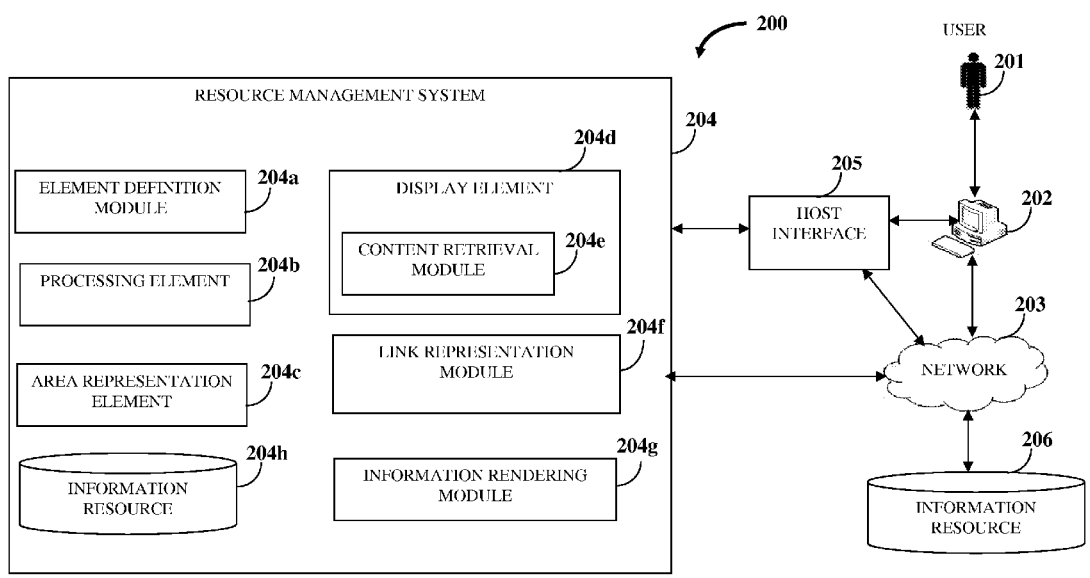
FIG. 2 illustrates a computer implemented system for displaying one or more information resources linked from a host interface on selected locations on the host interface.

FIG. 2 illustrates a computer implemented system 200 for displaying one or more information resources 204*h* or 206 linked from a host interface 205 on selected locations on the host interface 205. The computer implemented system 200 disclosed herein comprises a resource management system 204 and a host interface 205. The resource management system 204 manages defining and linking of a processing element 204*b*, an area representation element 204*c*, and a display element 204*d*, and the display of the information resources 204*h* or 206 in selected locations on the host interface 205. In an embodiment, the host interface 205 and the resource management system 204 are located on the user's 201 computing device 202. The user 201 accesses the host interface 205 on the user's 201 computing device 202. In another embodiment, the host interface 205 and the resource management system 204 are located on a remote server (not shown). The user 201 accesses the host interface 205 over a network 203, for example, the internet, a local area network (LAN), a wide area network, a mobile communication network, etc. In another embodiment, the host interface 205 is located on the user's 201 computing device 202, while the resource management system 204 is located on a remote server. The host interface 205 communicates with the resource management system 204 via the network 203, for example, the internet, a local area network (LAN), a wide area network, a mobile communication network, etc. The host interface 205 accesses the information resources 204*h* or 206 on the user's 201 computing device 202 or over the network 203.

The resource management system 204 comprises an element definition module 204*a*, an processing element 204*b*, an area representation element 204*c*, a display element 204*d*, and an information rendering module 204*g*, The element definition module 204*a* defines the processing element 204*b* for a link to an information resource 204*h* or 206 referenced in the host interface 205, the area representation element 204*c*, and the display element 204*d*. The processing element 204*b* determines an address of the information resource 204*h* or 206 referenced by the link. The area representation element 204*c* specifies locations on the host interface 205 for displaying the information resource 204*h* or 206 on the host interface 205. The information rendering module 204*g* renders the link referencing the information resource 204*h* or 206 with the processing element 204*b* to the user 201. The information rendering module 204*g* also renders the locations specified by the area representation element 204*c* for the display of the information resource 204*h* or 206 referenced by the rendered link to the user 201. The user 201 selects one of the specified locations for the display of the information resource 204*h* or 206 corresponding to the rendered link on the host interface 205. The display element 204*d* is linked to the processing element 204*b* for retrieving the address of the information resource 204*h* or 206. The display element 204*d* is also linked to the area representation element 204*c* for retrieving the location selected by the user 201. The display element 204*d* comprises a content retrieval module 204*e* for retrieving content of the information resource 204*h* or 206 from the retrieved address. The display element 204*d* displays the retrieved content in the selected location on the host interface 205.

The resource management system 204 further comprises a link representation module 204*f* for representing a link referencing the information resource 204*h* or 206 as a menu item selectable by the user 201 for displaying the information resource 204*h* or 206 corresponding to the menu item in the selected location on the host interface 205. In an embodiment, the display element 204*d* provides options to display or hide the specified locations on the host interface 205. In another embodiment, the display element 204*d* provides options to display or hide the retrieved content in the selected location on the host interface 205. In another embodiment, the display element 204*d* provides options to display content retrieved from multiple addresses in the selected location on the host interface 205.

Figure 3:
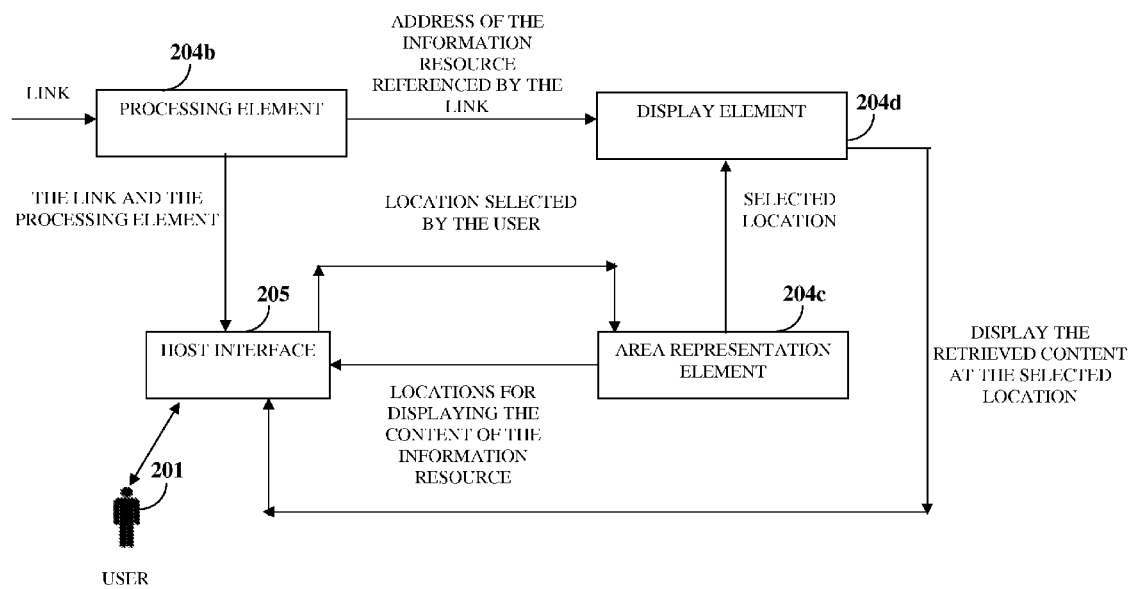
FIG. 3 exemplarily illustrates a flow diagram showing linking of a display element to a processing element and an area representation element for displaying an information resource linked from a host interface on a selected location on the host interface.

FIG. 3 illustrates a flow diagram showing linking of a display element 204*d* to a processing element 204*b* and an area representation element 204*c* for displaying an information resource 204h or 206 linked from a host interface 205 on a selected location on the host interface 205. A processing element 204b is defined for a link referencing an information resource 204h or 206. The processing element 204b determines an address referenced by the link. The processing element 204b and the link are rendered on the host interface 205 to the user 201. The area representation element 204c renders available locations on the host interface 205 to the user 201 for selection. The user 201 selects one of the locations via the host interface 205. The processing element 204b renders the address of the information resource 204h or 206 referenced by the link to the display element 204d. The area representation element 204c renders the selected location to the display element 204d. The display element 204d retrieves the content at the rendered address and displays the retrieved content on the selected location on the host interface 205. The process flow is repeated for other links referencing other information resources 204h or 206 on the host interface 205.

Figure 4:
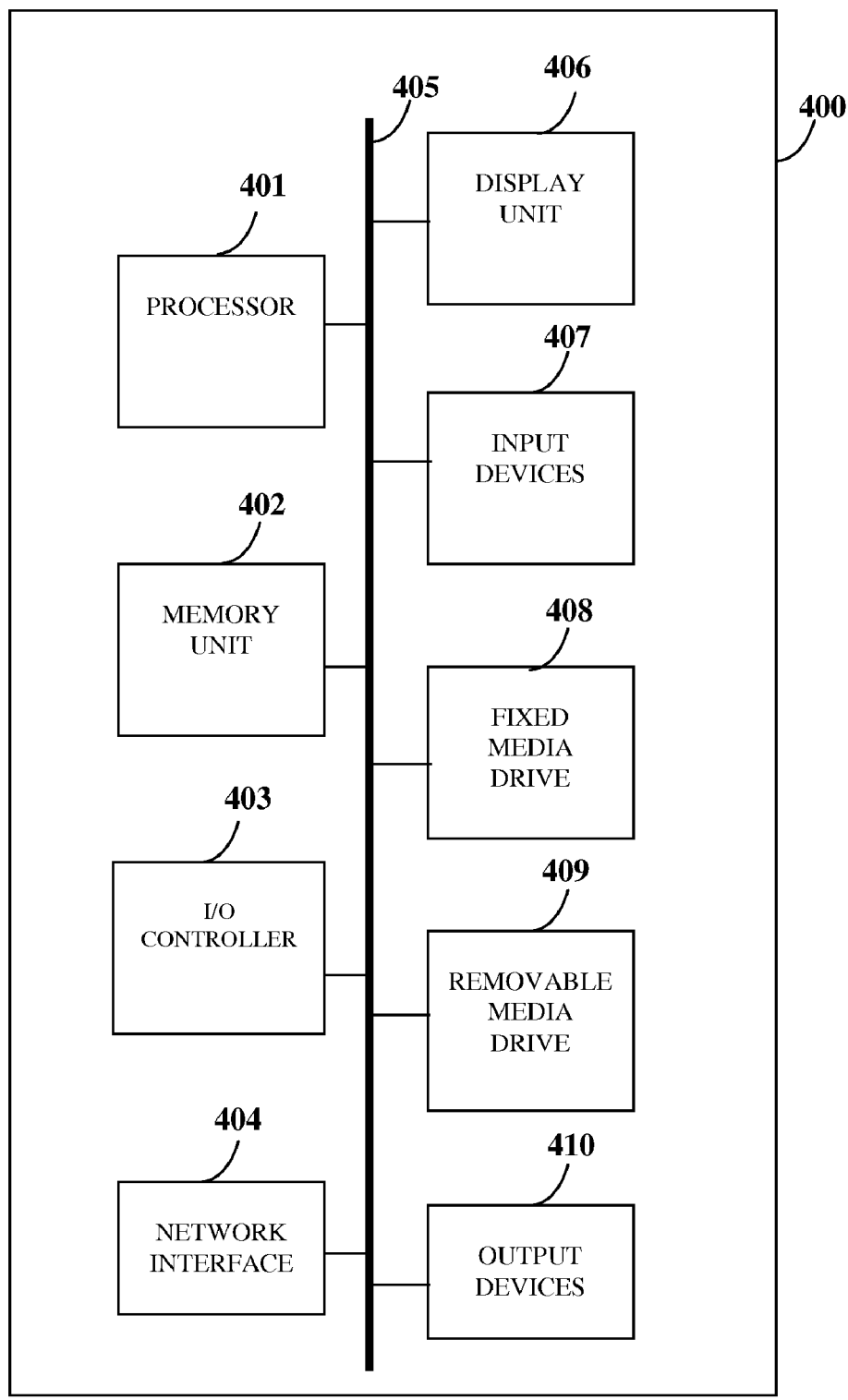
FIG. 4 exemplarily illustrates the architecture of a computer system employed for displaying one or more information resources linked from a host interface on selected locations on the host interface.

FIG. 4 exemplarily illustrates the architecture of a computer system 400 employed for displaying one or more information resources 204h or 206 linked from a host interface 205 on selected locations on the host interface 205. In an embodiment, the resource management system 204 of the computer implemented system 200 disclosed herein employs the architecture of the computer system 400 illustrated in FIG. 4. The user 201 accesses the host interface 205, for example, via a short range network or a long range network. The network 203 is, for example, a local area network (LAN), a wide area network, a mobile communication network, etc. The computer system 400 comprises, for example, a processor 401, a memory unit 402 for storing programs and data, an input/output (I/O) controller 403, a network interface 404, a data bus 405, a display unit 406, input devices 407, a fixed media drive 408, a removable media drive 409, output devices 410, etc.

The processor 401 is an electronic circuit that executes computer programs. The memory unit 402 is used for storing programs, applications, and data. The element definition module 204a of the resource management system 204 is stored on the memory unit 402 of the computer system 400. The memory unit 402 is, for example, a random access memory (RAM) or another type of dynamic storage device that stores information and instructions for execution by the processor 401. The memory unit 402 also stores temporary variables and other intermediate information used during execution of the instructions by the processor 401. The computer system 400 further comprises a read only memory (ROM) or another type of static storage device that stores static information and instructions for the processor 401. The network interface 404 enables connection of the computer system 400 to the network 203. The computer system 400 communicates with other computer systems of, for example, the user 201, through the network interface 404. The network interface 404 is, for example, a Bluetooth™ interface, an infrared (IR) interface, a WiFi interface, a universal serial bus interface (USB), a local area network (LAN) or wide area network (WAN) interface, etc. The I/O controller 403 controls the input actions, for example, clicking a link referencing an information resource 204h or 206 on the host interface 205, performed by the user 201 and output actions. The data bus 405 permits communications between the modules, for example, 204a, 204b, 204c, 204d, 204e, 204f, 204g, etc. of the computer implemented system 200 disclosed herein.

The display unit 406 displays, via the host interface 205, the results computed by the area representation element 204c and the display element 204d to the user 201. The input devices 407 are used for inputting data into the computer system 400. The input devices 407 are, for example, a keyboard such as an alphanumeric keyboard, a joystick, a mouse, a touch pad, a light pen, etc. The computer system 400 further comprises a fixed media drive 408 and a removable media drive 409 for receiving removable media.

Computer applications and programs are used for operating the computer system 400. The programs are loaded onto the fixed media drive 408 and into the memory unit 402 of the computer system 400 via the removable media drive 409. In an embodiment, the computer applications and programs may be loaded directly through the network 203. Computer applications and programs are executed by double clicking a related icon displayed on the display unit 406 using one of the input devices 407. The user 201 interacts with the computer system 400 via the host interface 205 using the display unit 406.

The computer system 400 employs an operating system for performing multiple tasks. The operating system is responsible for management and coordination of activities and sharing of the resources of the computer system 400. The operating system further manages security of the computer system 400, peripheral devices connected to the computer system 400, and network connections. The operating system employed on the computer system 400 recognizes, for example, inputs provided by the user 201 using one of the input devices 407, the output display, files and directories stored locally on the fixed media drive 408, for example, a hard drive, etc. The operating system on the computer system 400 executes different programs, for example, a web browser, an electronic mail application, etc. initiated by the user 201 using the processor 401. Instructions for executing the modules 204a, 204b, 204c, 204d, 204e, 204f, 204g, etc. of the resource management system 204 are retrieved by the processor 401 from the program memory in the form of signals. A program counter (PC) determines locations of the instructions in the program memory. The program counter stores a number that identifies the current position in the program of the modules 204a, 204b, 204c, 204d, 204e, 204f, 204g, etc. of the resource management system 204.

The instructions fetched by the processor 401 from the program memory after being processed are decoded. The instructions are placed in an instruction register (IR) in the processor 401. After processing and decoding, the processor 401 executes the instructions. For example, the element definition module 204a defines instructions for defining a processing element 204b for a link referenced in the host interface 205, an area representation element 204c, and a display element 204d. The processing element 204b defines instructions for determining an address of one of the information resources 204h or 206 referenced by the link. The area representation element 204c defines instructions for specifying locations on the host interface 205 for displaying one of the information resources 204h or 206 on the host interface 205. The display element 204d displays content of the information resource 204h or 206 on the host interface 205. The information rendering module 204g defines instructions for rendering the link referencing the information resource 204h or 206 with the processing element 204b to a user 201 and for rendering the locations specified by the area representation element 204c for displaying the information resource 204h or 206 referenced by the rendered link to the user 201. The content retrieval module 204e defines instructions for retrieving the content of the information resource 204h or 206 from the retrieved address. The link representation module 204f defines instructions for representing each link referencing each of the information resources 204h or 206 as a menu item selectable by the user 201 for displaying the information in the selected location on the host interface 205.

The processor 401 of the resource management system 204 retrieves the instructions defined by the element definition module 204a, the processing element 204b the area representation element 204c, the display element 204d, the information rendering module 204g, the content retrieval module 204e, and the link representation module 204f, and executes the instructions. At the time of execution, the instructions stored in the instruction register are examined to determine the operations to be performed. The operations include arithmetic and logic operations. The processor 401 then performs the specified operation. The operating system performs multiple routines for performing a number of tasks required to assign the input devices 407, the output devices 410, and memory for execution of the modules 204a, 204b, 204c, 204d, 204e, 204f, 204g, etc. of the resource management system 204. The tasks performed by the operating system comprise assigning memory to the modules 204a, 204b, 204c, 204d, 204e, 204f, 204g, etc. of the resource management system 204 and data, moving data between the memory unit 402 and disk units and handling input/output operations. The operating system performs the tasks, on request, by the operations and after performing the tasks, the operating system transfers the execution control back to the processor 401. The processor 401 continues the execution to obtain one or more outputs. The outputs of the execution of the modules 204a, 204b, 204c, 204d, 204e, 204f, 204g, etc. of the resource management system 204 are displayed to the user 201. In an embodiment, the resource management system 204 employs the processor of the user's 201 computing device 202. In another embodiment, the resource management system 204 employs the processor of a remote computer system.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 401, except for a transitory, propagating signal.

The computer program product disclosed herein comprises multiple computer program codes for displaying multiple information resources 204h or 206 linked from a host interface 205 on selected locations on the host interface 205. For example, the computer program product disclosed herein comprises a first computer program code for defining a processing element 204b for a link to one of the information resources 204h or 206 referenced in the host interface 205, a second computer program code for rendering the link referencing one of the information resources 204h or 206 with the processing element 204b to a user 201, a third computer program code for defining an area representation element 204c for specifying locations on the host interface 205 for displaying the information resource 204h or 206 on the host interface 205, a fourth computer program code for rendering the locations specified by the area representation element 204c for displaying the information resource 204h or 206 referenced by the rendered link to the user 201, a fifth computer program code for defining a display element 204d for displaying content of the information resource 204h or 206 on the host interface 205, a sixth computer program code for retrieving the content of the information resource 204h or 206 from the retrieved address, a seventh computer program code for displaying the retrieved content of the information resource 204h or 206 in the selected location on the host interface 205, an eighth computer program code for representing each link referencing each of the information resources 204h or 206 as a menu item selectable by the user 201, a ninth computer program code for providing options to display or hide the specified locations on the host interface 205, and a tenth computer program code for providing options to display content retrieved from multiple addresses in the selected location.

The computer program codes comprising the computer executable instructions are embodied on the non-transitory computer readable storage medium. The processor 401 of the computer system 400 retrieves these computer executable instructions and executes them. When the computer executable instructions embodied on the non-transitory computer readable storage medium are executed by the processor 401, the computer executable instructions cause the processor 401 to perform the method steps for displaying multiple information resources 204h or 206 linked from the host interface 205 on selected locations on the host interface 205. In an embodiment, a single piece of computer program code comprising computer executable instructions performs one or more steps of the computer implemented method disclosed herein for displaying multiple information resources 204h or 206 linked from the host interface 205 on selected locations on the host interface 205.

For purposes of illustration, the detailed description refers to the resource management system 204 being run locally on a computer system 400; however the scope of the computer implemented method and system 200 disclosed herein is not limited to the resource management system 204 being run locally on the computer system 400 via the operating system and the processor 401 but may be extended to run remotely over the network 203 by employing a web browser and a remote server, a mobile phone, or other electronic devices.

Figure 5:
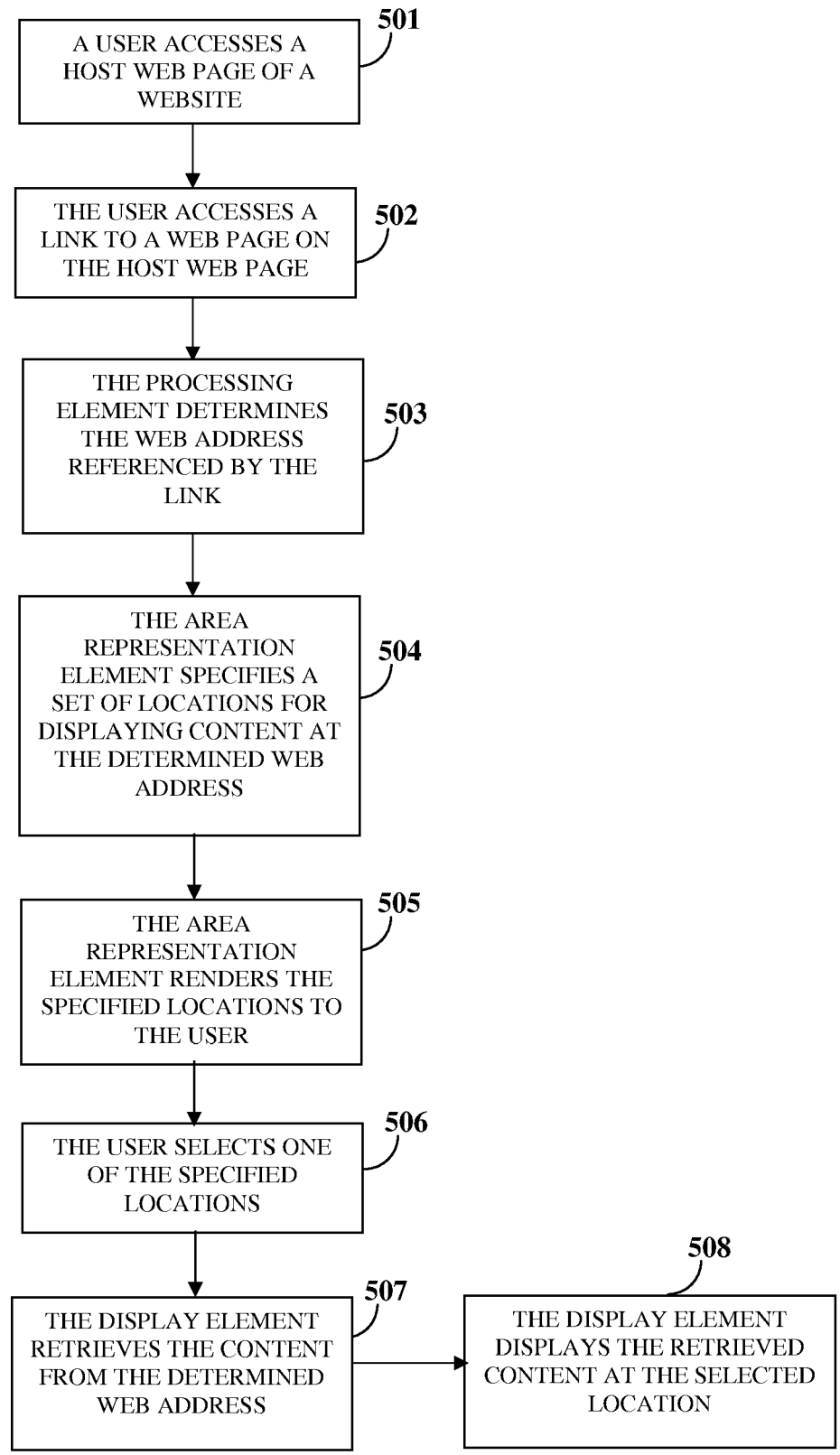
FIG. 5 exemplarily illustrates a flow diagram for displaying a web page on a host web page in a location selected by a user.

FIG. 5 exemplarily illustrates a flow diagram for displaying a web page on a host interface 205, for example, a host web page in a location selected by a user 201. In this example, the host interface 205 is implemented on a browser application. The user 201 invokes the browser application and accesses the host web page of a website to open multiple web pages on the host web page. The user 201 accesses 501 the host web page of the website by entering a link or a uniform resource locator (URL) of the website in the address bar of the browser application. The user 201 accesses 502 the link to a web page on the host web page via a mouse click or one or more keystrokes. The processing element 204b determines 503 the web address of the web page referenced by the link. The area representation element 204c specifies 504 a set of locations for displaying the content of the web page at the determined address. In addition to the set of locations, the user 201 preselects a set of locations for displaying the content at the determined address. The area representation element 204c renders 505 the specified locations to the user 201. The user 201 selects 506 one of the specified locations. The display element 204d retrieves 507 the content from the determined web address. The display element 204d displays 508 the retrieved content at the selected location on the host web page 205 to the user 201.

FIGS. 6A-6F exemplarily illustrate screenshots of a host interface 205, for example, a host web page, that provides options for displaying multiple web pages on the host web page in locations selected by a user 201. Consider an example where a user 201 accesses a link to a website, for example, www.google.com of Google™ Inc. through the user's 201 computing device 202 and performs a web based search for an online dictionary encyclopedia. The search performed by the user 201 results in a display of a host web page showing search results. The host web page displays a list of websites relevant to the online dictionary encyclopedia. For example, the host web page displays a list of websites, for example, "www.encyclopedia.com", "www.britannica.com", "www.wikipedia.org", "encarta.msn.org", and "en.wikipedia.org" as exemplarily illustrated in FIG. 6A.

The resource management system 204 of the computer implemented system 200 disclosed herein defines a processing element W1 601a and a processing element W2 601b graphically represented by the OpenUp icon and the OpenDn icon respectively for each link displayed on the host web page. The processing elements W1 601a and W2 601b determine the web address referenced by each link displayed on the host web page. The processing elements W1 601a and W2 601b are programmed to process the web address which is associated with them. The area representation element 204c specifies locations S1 602 and S2 603 accessible via the OpenUp icon and the OpenDn icon respectively on the host web page which specify the locations where a target of the web address can be opened by the associated display element 204d. The processing elements W1 601a and W2 601b are programmatically linked to the specified locations S1 602 and S2 603 respectively. Each of the specified locations S1 602 and S2 603 is associated with a display element 204d. Each of the processing elements W1 601a and W2 601b causes the associated link to open in the locations selected by the user 201. For example, on clicking the OpenUp icon representing the processing element W1 601a, the processing element W1 601a loads the link into the selected location S1 602. The display element 204d associated with the selected location S1 602 displays the content at the web address in the selected location S1 602. Similarly, on clicking the OpenDn icon representing the processing element W2 601b, the processing element W2 601b loads the link into the selected location S2 603. The display element 204d associated with the selected location S2 603 displays the content at the web address in the selected location S2 603.

Consider an example where a user 201 clicks on the OpenUp icon rendered with the website "msn.encrata.org". The processing element W1 601a associated with the OpenUp icon determines the web address referenced by the link of "msn.encarta.org" and renders the determined web address to the display element 204d associated with the selected location S1 602. The display element 204d retrieves the content of the website "msn.encarta.org" using the rendered web address and displays the retrieved content in the selected location S1 602 as exemplarily illustrated in FIG. 6B. If the user 201 clicks on the OpenDn icon rendered with the website "en.wikipedia.org", the processing element W2 601b associated with the OpenDn icon determines the web address referenced by the link of "en.wikipedia.org" and renders the determined web address of the website "en.wikipedia.org" to the display element 204d associated with the selected location S2 603. The display element 204d retrieves the content of the website "en.wikipedia.org" and displays the retrieved content in the selected location S2 603 as exemplarily illustrated in FIG. 6B.

Figure 6A:
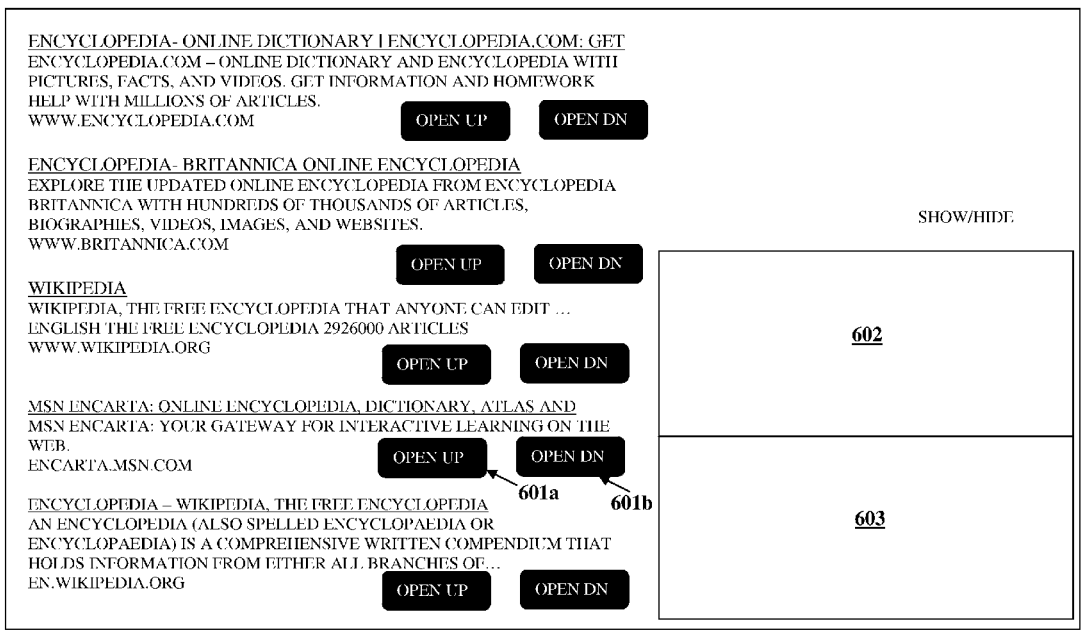
FIGS. 6A-6F exemplarily illustrate screenshots of a host web page that provides options for displaying multiple web pages on the host web page in locations selected by a user.
Figure 6B:
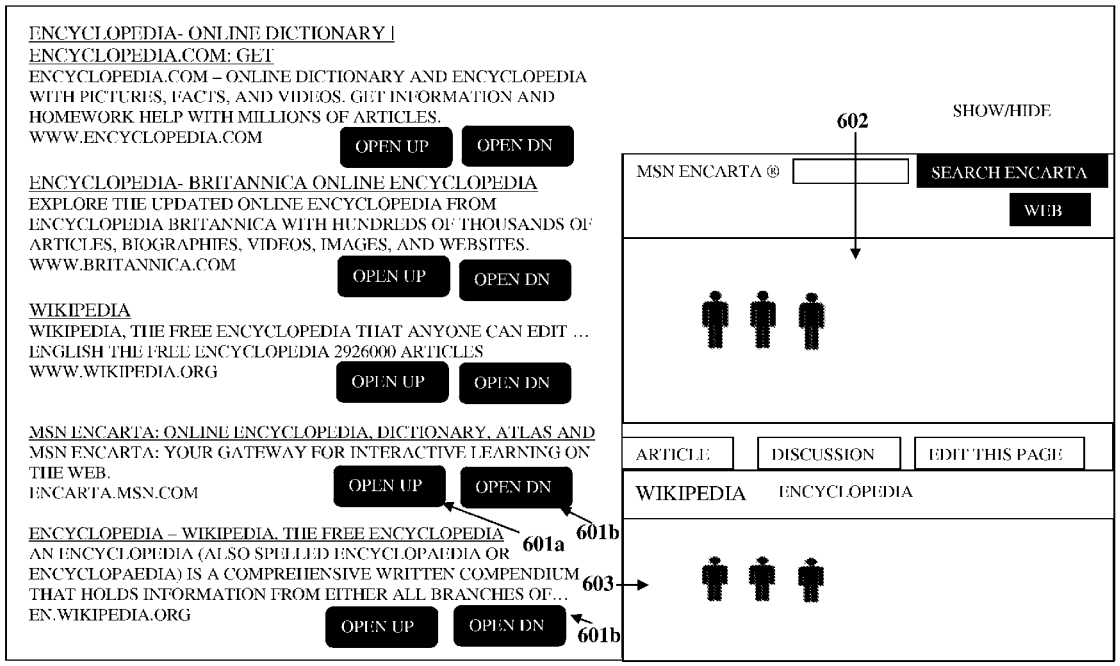
Figure 6C:
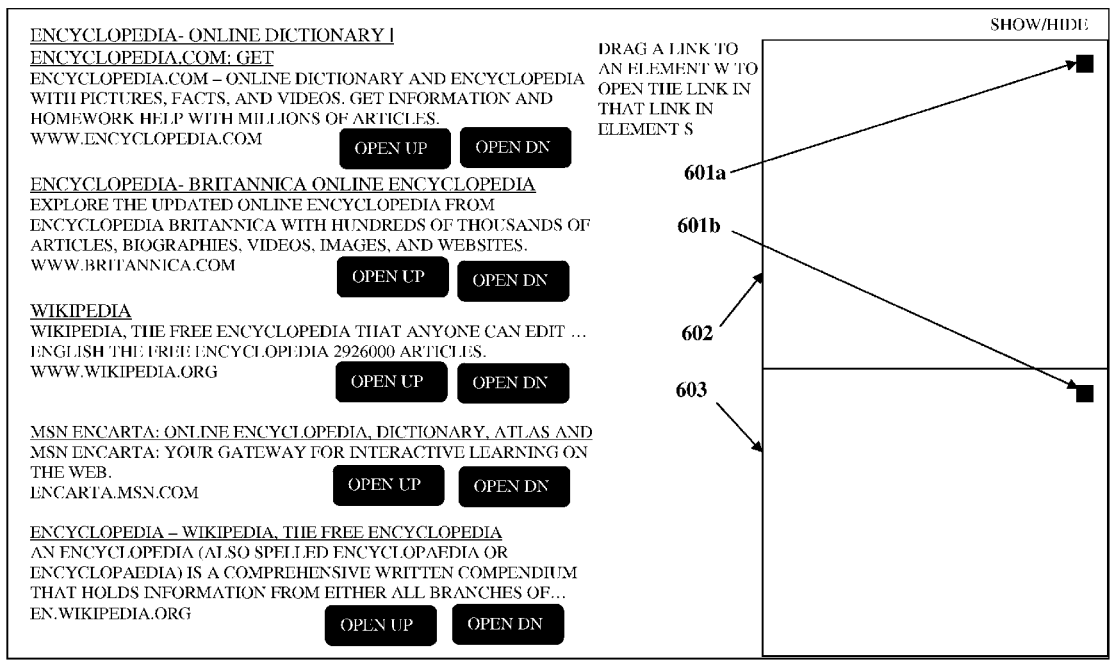

The user 201 may also drag and drop the web address of the website, "en.wikipedia.org" into the processing element W1 601a as exemplarily illustrated in FIG. 6C to display the content of "en.wikipedia.org" in the selected location S1 602. The processing element W1 601a determines the web address of the website "en.wikipedia.org" and renders the determined web address to the display element 204d associated with the selected location S1 602. The display element 204d retrieves the content of the website, "en.wikipedia.org" and displays the content of "en.wikipedia.org" in the selected location S1 602. Similarly, the user 201 may drag and drop the web address of another website into the processing element W2 601b as exemplarily illustrated in FIG. 6C to display the content of the other website in the selected location S2 603. The user 201 also has the option to show or hide the selected location S1 602 or the selected location S2 603 with the retrieved content on the host web page. The selected location S1 602 and the selected location S2 603 can be hidden until the processing elements W1 601a and W2 601b respectively are activated. Upon activation, the selected location S1 602 or the selected location S2 603 with the retrieved content are shown. The user 201 can therefore reopen, for example, a window with the earlier retrieved content intact. The user 201 may also show or hide the retrieved content in the selected location S1 602 or the selected location S2 603 on the host web page.

Figure 6D:
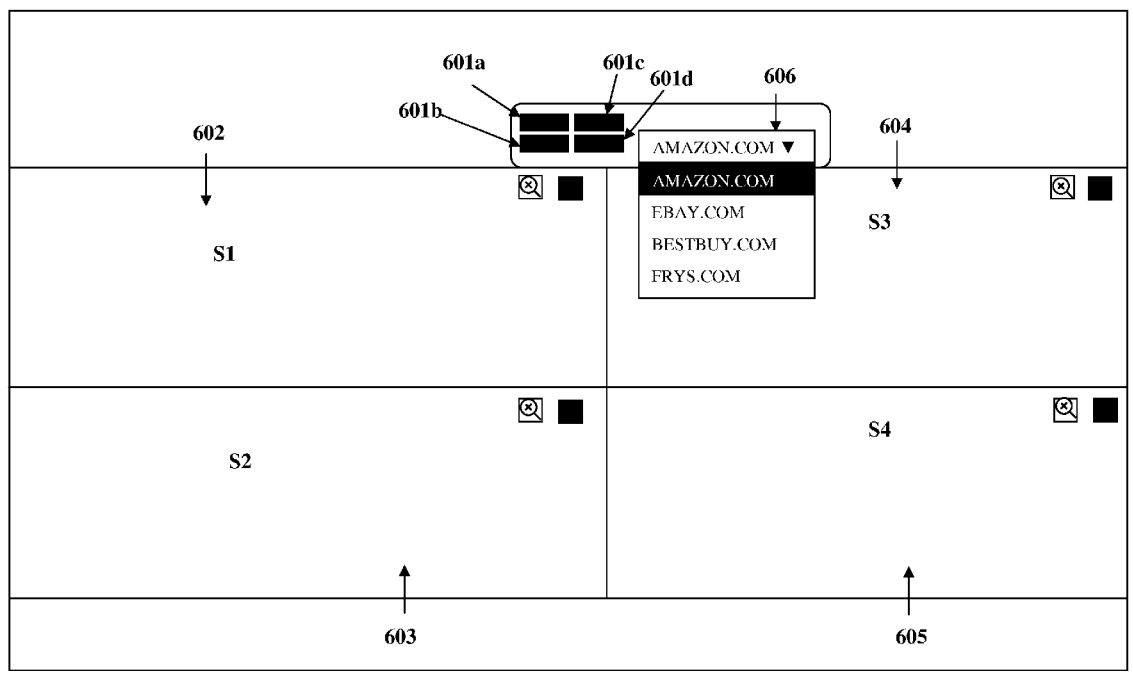
Figure 6E:
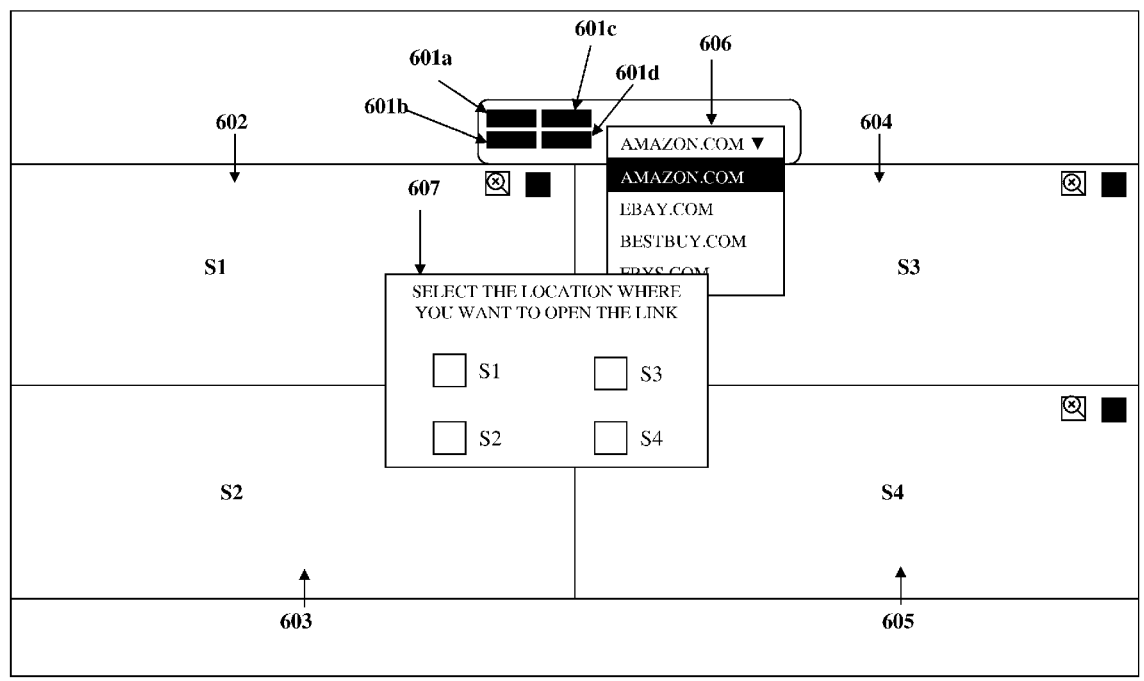
Figure 6F:
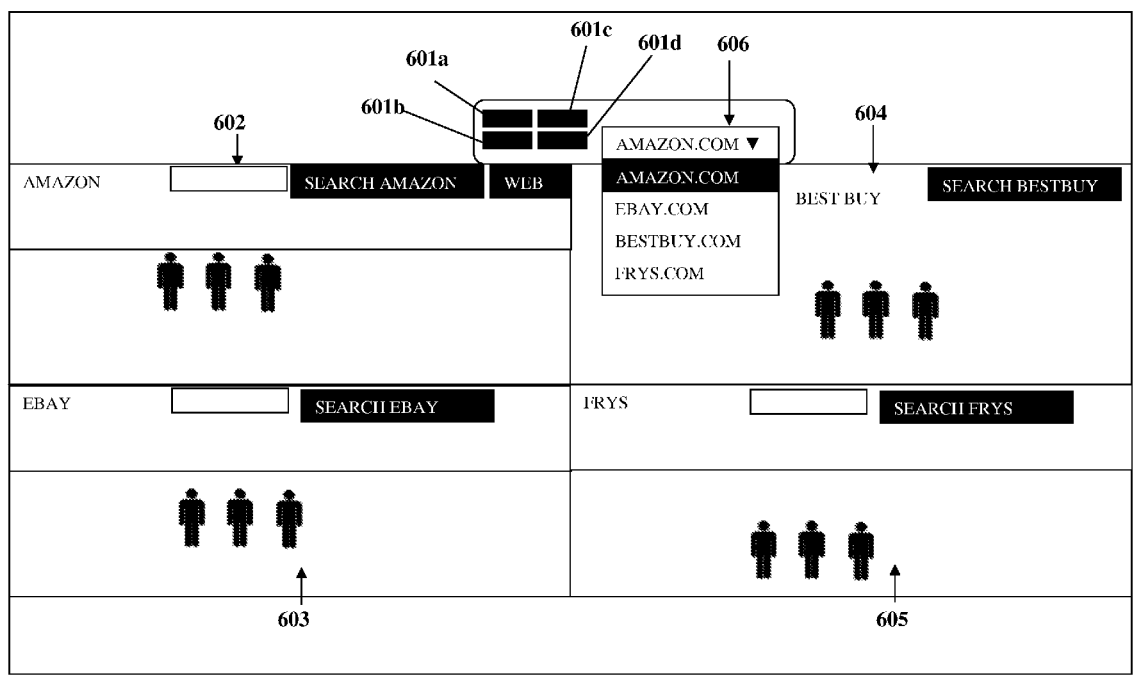

The resource management system 204 of the computer implemented system 200 disclosed herein may also define four processing elements, for example, processing element W1 601a, processing element W2 601b, processing element W3 601c, and processing element W4 601d that reference a drop down list 606 of menu items as exemplarily illustrated in FIG. 6D. The menu items represent links corresponding to websites. The area representation element 204c of the resource management system 204 specifies four available locations, for example, S1 602, S2 603, S3 604, and S4 605 on the host web page for displaying the content of web pages referenced by the links. The drop down list 606 displays a list of websites, for example, "amazon.com", "ebay.com", "bestbuy.com", and "frys.com" referenced by the processing elements W1 601a, W2 601b, W3 601c, and W4 601d as exemplarily illustrated in FIG. 6D.

If a user 201 selects the website "amazon.com" from the drop down list 606, the processing element W1 601a determines the web address of the website "amazon.com". In an embodiment, the area representation element 204c opens up a popup window 607 requesting the user 201 to select one of the available locations S1 602, S2 603, S3 604, and S4 605 as exemplarily illustrated in FIG. 6E. The user 201 selects the location S1 602. The web address of the website "amazon.com" determined by the processing element W1 601a is rendered to the display element 204d. The selected location S1 602 is rendered to the display element 204d. The display element 204d retrieves the content of the website "amazon.com" and displays the content of the website "amazon.com" in the selected location S1 602 as exemplarily illustrated in FIG. 6F.

If the user 201 selects the website "ebay.com" from the drop down list 606, the processing element W2 601b determines the web address of the website "ebay.com". The area representation element 204c opens up a popup window 607 requesting the user 201 to select one of the available locations S1 602, S2 603, S3 604, and S4 605 as exemplarily illustrated in FIG. 6E. The user 201 selects the location S2 603. The web address of the website "ebay.com" determined by the processing element W2 601b is rendered to the display element 204d. The selected location S2 603 is rendered to the display element 204d. The display element 204d retrieves the content of the website "ebay.com" and displays the content of the website "ebay.com" in the selected location S2 603 as exemplarily illustrated in FIG. 6F.

If the user 201 selects the website "bestbuy.com" from the drop down list 606, the processing element W3 601c determines the web address of the website "bestbuy.com". The area representation element 204c opens up a popup window 607 requesting the user 201 to select one of the available locations S1 602, S2 603, S3 604, and S4 605 as exemplarily illustrated in FIG. 6E. The user 201 selects the location S3 604. The web address of the website "bestbuy.com" determined by the processing element W3 601c is rendered to the display element 204d. The selected location S3 604 is rendered to the display element 204d. The display element 204d retrieves the content of the website "bestbuy.com" and displays the content of the website "bestbuy.com" in the selected location S3 604 as exemplarily illustrated in FIG. 6F.

If the user 201 selects the website "frys.com" from the drop down list 606, the processing element W4 601d determines the web address of the website "frys.com". The area representation element 204c opens up a popup window 607 requesting the user 201 to select one of the available locations S1 602, S2 603, S3 604, and S4 605 as exemplarily illustrated in FIG. 6E. The user 201 selects the location S4 605. The web address of the website "frys.com" determined by the processing element W4 601d is rendered to the display element 204d. The selected location S4 605 is rendered to the display element 204d. The display element 204d retrieves the content of the website "frys.com" and displays the content of the website "frys.com" in the selected location S4 605 as exemplarily illustrated in FIG. 6F.

Figure 7:
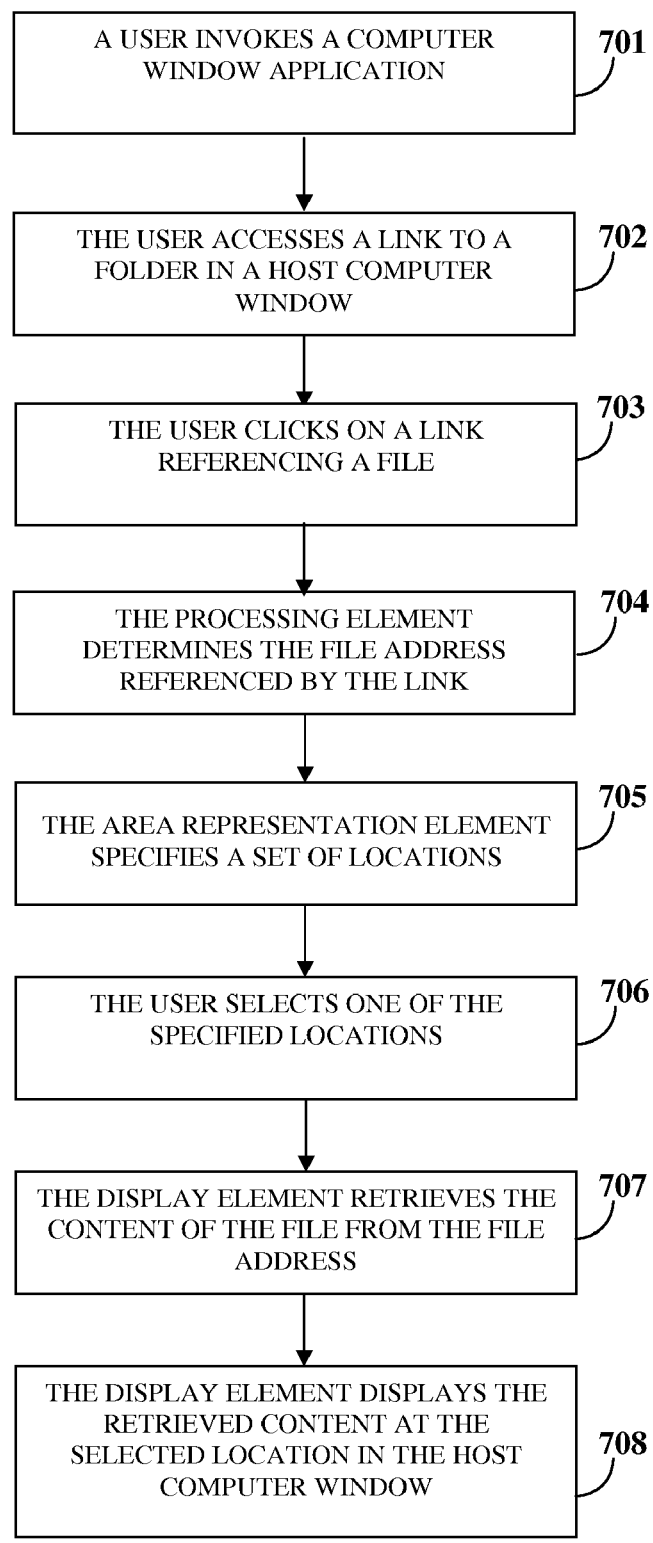
FIG. 7 exemplarily illustrates a flow diagram for displaying files on a host computer window in locations selected by a user.

FIG. 7 exemplarily illustrates a flow diagram for displaying files on a host interface 205, for example, a host computer window in locations selected by a user 201. In this embodiment, the host interface 205 is implemented on a computer window application. The user 201 invokes 701 the computer window application. The user 201 accesses 702 a link to a folder in the host computer window via a computer mouse click or one or more keystrokes. The files or documents of information present in the folder open up as links in the host computer window. The user 201 clicks 703 on a link referencing a file. The processing element 204b determines 704 the file address referenced by the link. The area representation element 204c specifies 705 a set of locations to the user 201 for displaying the content of the file from the determined file address. The user 201 selects 706 one of the specified locations. The display element 204d retrieves 707 the content of the file from the file address. The display element 204d displays 708 the retrieved content at the selected location in the host computer window.

Figure 8A:
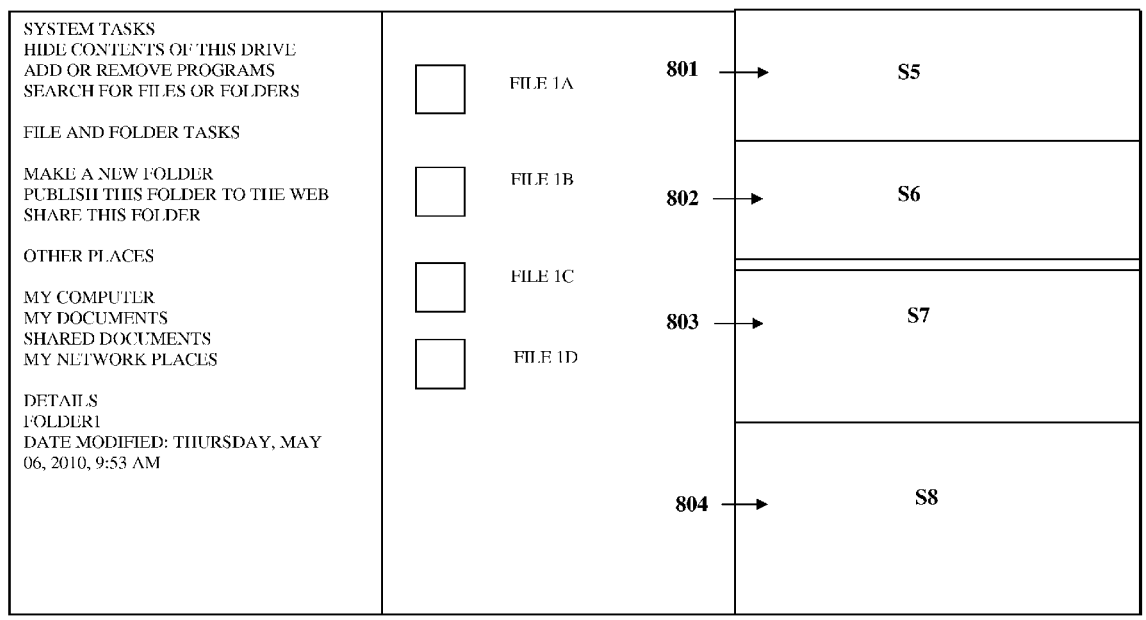
FIGS. 8A-8C exemplarily illustrate screenshots of a host computer window that provides options for displaying multiple files of a folder in a host computer window in locations selected by a user.
Figure 8B:
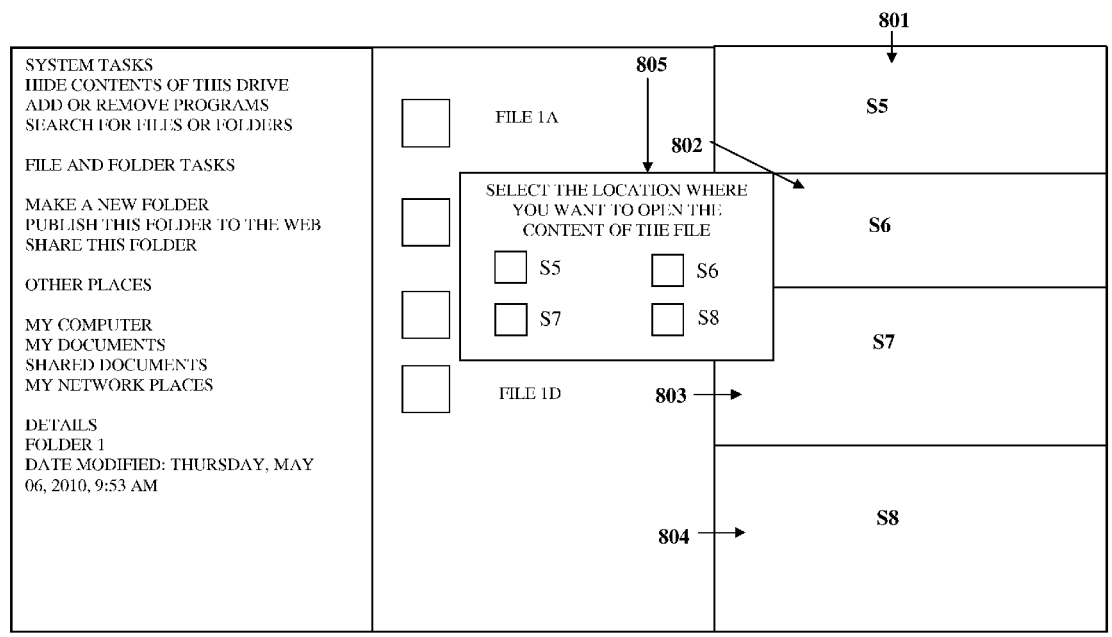
Figure 8C:
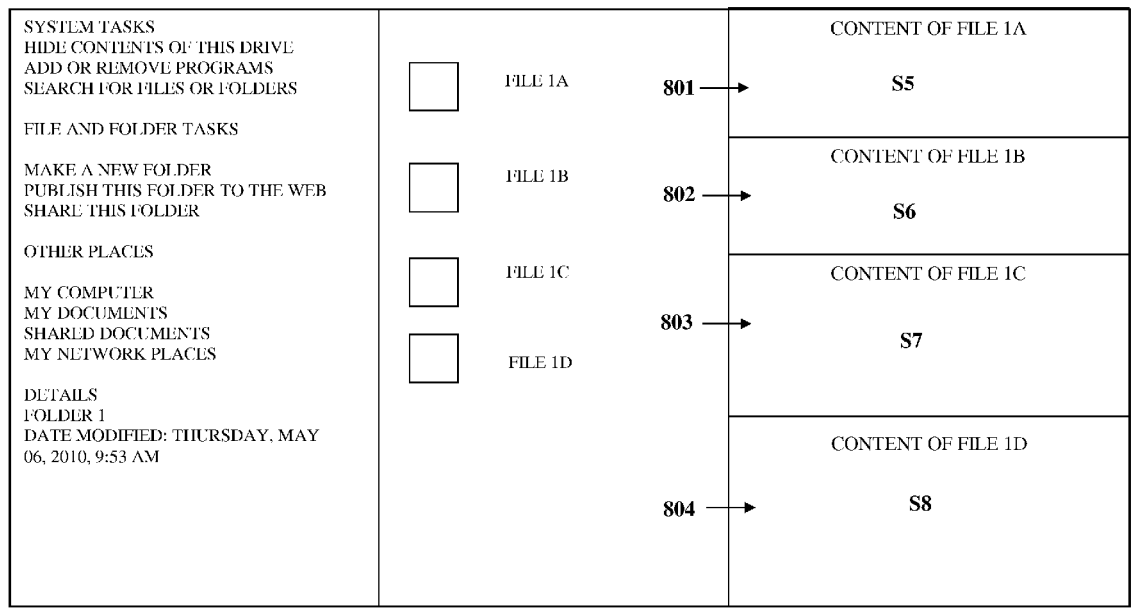

FIGS. 8A-8C exemplarily illustrate screenshots of a host computer window that provides options for displaying multiple files of a folder in a host computer window in locations selected by a user 201. Consider an example where a user 201 accesses a "folder 1" stored on the user's 201 computing device 202 via the host computer window. The host computer window on the user's 201 computing device 202 displays the contents of the "folder1". The contents of "folder1" are, for example, "file 1A", "file 1B", "file 1C", and "file 1D". Each of the files is associated with a link for opening the content of the respective file. The area representation element 204c specifies four available locations S5 801, S6 802, S7 803 and S8 804 for displaying the content retrieved from the files on the host computer window as exemplarily illustrated in FIG. 8A.

When the user 201 clicks on the link referencing "file 1A", the processing element 204b determines the file address of "file 1A". The area representation element 204c displays a popup window 805 rendering the specified locations S5 801, S6 802, S7 803, and S8 804 to the user 201 as exemplarily illustrated in FIG. 8B. The user 201 selects the location S5 801. The determined file address of "file 1A" and the selected location S5 801 are rendered to the display element 204d. The display element 204d retrieves the content of "file 1A" from the file address of "file 1A" and displays the retrieved content in the selected location S5 801 as exemplarily illustrated in FIG. 8C. Furthermore, the user 201 can drag and drop the link of "file 1A" into the selected location S5 801 for displaying the content of "file 1A" in the selected location S5 801 on the host computer window.

When the user 201 clicks on the link referencing "file 1B", the processing element 204b determines the file address of "file 1B". The area representation element 204c displays a popup window 805 rendering the specified locations S5 801, S6 802, S7 803, S8 804 to the user 201 as exemplarily illustrated in FIG. 8B. The user 201 selects the location S6 802. The determined file address of "file 1B" and the selected location S6 802 are rendered to the display element 204d. The display element 204d retrieves the content of "file 1B" from the file address of "file 1B" and displays the retrieved content in the selected location S6 802 as exemplarily illustrated in FIG. 8C. Furthermore, the user 201 can drag and drop the link of "file 1B" into the selected location S6 802 for displaying the content of "file 1B" in the selected location S6 802 on the host computer window.

When the user 201 clicks on the link referencing "file 1C", the processing element 204b determines the file address of "file 1C". The area representation element 204c displays a popup window 805 rendering the specified locations S5 801, S6 802, S7 803, S8 804 to the user 201 as exemplarily illustrated in FIG. 8B. The user 201 selects the location S7 803. The determined file address of "file 1C" and the selected location S7 803 are rendered to the display element 204d. The display element 204d retrieves the content of "file 1C" from the file address of "file 1C" and displays the retrieved content in the selected location S7 803 as exemplarily illustrated in FIG. 8C. Furthermore, the user 201 can drag and drop the link of "file 1C" into the selected location S7 803 for displaying the content of "file 1C" in the selected location S7 803 on the host computer window.

When the user 201 clicks on the link referencing "file 1D", the processing element 204b determines the file address of "file 1D". The area representation element 204c displays a popup window 805 rendering the specified locations S5 801, S6 802, S7 803, S8 804 to the user 201 as exemplarily illustrated in FIG. 8B. The user 201 selects the location S8 804. The determined file address of "file 1D" and the selected location S8 804 are rendered to the display element 204d. The display element 204d retrieves the content of "file 1D" from the file address of "file 1D" and displays the retrieved content in the selected location S8 804 as exemplarily illustrated in FIG. 8C. Furthermore, the user 201 can drag and drop the link of "file 1D" into the selected location S8 804 for displaying the content of "file 1D" in the selected location S8 804 on the host computer window.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as an object code. The computer program product disclosed herein comprises computer executable instructions embodied in a non-transitory computer readable storage medium, wherein the computer program product comprises computer program codes for implementing the processes of various embodiments.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method for displaying one or more of a plurality of information resources linked from a host interface on selected locations on said host interface, comprising:
    defining a processing element for a link to one of said information resources referenced in said host interface, wherein said processing element determines an address of said one of said information resources referenced by said link;
    rendering said link referencing said one of said information resources with said processing element to a user;
    defining an area representation element for specifying locations on said host interface for displaying said one of said information resources on said host interface;
    rendering said locations specified by said area representation element for display of said one of said information resources referenced by said rendered link to said user, wherein said user selects one of said specified locations for said display of said one of said information resources corresponding to said rendered link on said host interface;
    defining a display element for displaying content of said one of said information resources on said host interface, wherein said display element is linked to said processing element for retrieving said address of said one of said information resources, and wherein said display element is linked to said area representation element for retrieving said selected one of said specified locations;
    retrieving said content of said one of said information resources from said retrieved address by said linked display element; and
    displaying said retrieved content of said one of said information resources in said selected one of said specified locations on said host interface by said linked display element;
    whereby said user views one or more of said information resources on said host interface in said locations selected by said user.

2. The computer implemented method of claim 1, wherein said host interface is implemented on one of a browser application and a computer window application.

3. The computer implemented method of claim 1, wherein said address of said one of said information resources is one of a web address, a directory address, and a file address accessible via said host interface.

4. The computer implemented method of claim 1, wherein said host interface is accessible by said user via one of a computing device of said user and a network.

5. The computer implemented method of claim 1, further comprising providing options to one of display and hide said retrieved content in said selected one of said specified locations on said host interface by said linked display element.

6. The computer implemented method of claim 1, further comprising providing options to one of display and hide said specified locations on said host interface by said linked display element.

7. The computer implemented method of claim 1, further comprising providing options to one of display and hide said specified locations on said host interface by said linked display element prior to activation of said processing element.

8. The computer implemented method of claim 1, further comprising providing options to display content retrieved from a plurality of addresses in said selected one of said specified locations on said host interface by said linked display element.

9. The computer implemented method of claim 1, further comprising preselecting a set of locations for displaying said information resources on said host interface by said user, wherein said preselected set of locations are stored by said area representation element.

10. The computer implemented method of claim 9, wherein said area representation element renders available locations and said preselected set of locations to said user for said selection, wherein said user selects one of said rendered locations for displaying said one of said information resources on said host interface.

11. The computer implemented method of claim 1, further comprising selecting a plurality of characteristics for said display of said one of said information resources on said host interface by said user, wherein said characteristics are associated with said locations selected by said user.

12. The computer implemented method of claim 11, wherein said characteristics comprise dimensions, appearance, and audio elements for said locations on said host interface.

13. The computer implemented method of claim 11, wherein said area representation element specifies said locations on said host interface based on said selected characteristics, and wherein said linked display element displays said retrieved content of said one of said information resources in said selected one of said specified locations on said host interface based on said selected characteristics.

14. The computer implemented method of claim 1, further comprising representing each said link referencing each of said information resources as a menu item selectable by said user for displaying said one of said information resources corresponding to said menu item in said selected one of said specified locations on said host interface.

15. The computer implemented method of claim 1, wherein said retrieved content of said one of said information resources is displayed in said selected one of said specified locations on said host interface by one or more of: manually entering said link in a predefined location on said host interface; activating said rendered link via an input from said user; and transferring said rendered link referencing said one of said information resources to said display element.

16. The computer implemented method of claim 1, wherein said link referencing said one of said information resources is associated with said processing element by one of:
 transferring said link referencing said one of said information resources by said user to said processing element; and
 manually entering said link referencing said one of said information resources by said user into said processing element.

17. A computer implemented system for displaying one or more of a plurality of information resources linked from a host interface on selected locations on said host interface, comprising:
 a resource management system located on a computing device comprising one or more processors, said computing device providing said host interface, said host interface being an interaction display area between a user and said computing device, said resource management system further comprising:
 an element definition module that defines a processing element for a link to one of said information resources referenced in said host interface, an area representation element, and a display element;
 said processing element that determines an address of said one of said information resources referenced by said link;
 said area representation element that specifies locations on said host interface for displaying said one of said information resources on said host interface;
 said display element that displays content of said one of said information resources on said host interface, wherein said display element is linked to said processing element for retrieving said address of said one of said information resources, and wherein said display element is linked to said area representation element for retrieving one of said locations selected by a user;
 an information rendering module that performs: rendering said link referencing said one of said information resources with said processing element to said user; and rendering said locations specified by said area representation element for display of said one of said information resources referenced by said rendered link to said user, wherein said user selects one of said specified locations for said display of said one of said information resources corresponding to said rendered link on said host interface; and a content retrieval module in said display element that retrieves said content of said one of said information resources from said retrieved address, wherein said display element displays said retrieved content in said selected one of said specified locations on said host interface.

18. The computer implemented system of claim 17, wherein said resource management system further comprises a link representation module that represents each said link referencing each of said information resources as a menu item selectable by said user for displaying said one of said information resources corresponding to said menu item in said selected one of said specified locations on said host interface.

19. The computer implemented system of claim 17, wherein said display element provides options to one of display and hide said retrieved content in said selected one of said specified locations on said host interface.

20. The computer implemented system of claim 17, wherein said display element provides options to one of display and hide said specified locations on said host interface.

21. The computer implemented system of claim 17, wherein said display element provides options to display content retrieved from a plurality of addresses in said selected one of said specified locations on said host interface.

22. A computer program product comprising computer executable instructions embodied in a non-transitory computer readable storage medium, wherein said computer program product comprises: a first computer program code for defining a processing element for a link to one of a plurality of information resources referenced in said host interface, wherein said processing element determines an address of said one of said information resources referenced by said link;
 a second computer program code for rendering said link referencing said one of said information resources with said processing element to a user;
 a third computer program code for defining an area representation element for specifying locations on said host interface for displaying said one of said information resources on said host interface;
 a fourth computer program code for rendering said locations specified by said area representation element for display of said one of said information resources referenced by said rendered link to said user, wherein said user selects one of said specified locations for said display of said one of said information resources corresponding to said rendered link on said host interface;

a fifth computer program code for defining a display element for displaying content of said one of said information resources on said host interface, wherein said display element is linked to said processing element for retrieving said address of said one of said information resources, and wherein said display element is linked to said area representation element for retrieving said selected one of said specified locations;

a sixth computer program code for retrieving said content of said one of said information resources from said retrieved address by said linked display element; and a seventh computer program code for displaying said retrieved content of said one of said information resources in said selected one of said specified locations on said host interface by said linked display element.

23. The computer program product of claim 22, further comprising an eighth computer program code for representing each said link referencing each of said information resources as a menu item selectable by said user for displaying said one of said information resources corresponding to said menu item in said selected one of said specified locations on said host interface.

24. The computer program product of claim 22, further comprising a ninth computer program code for providing options to one of display and hide said specified locations on said host interface by said linked display element.

25. The computer program product of claim 22, further comprising a tenth computer program code for providing options to display content retrieved from a plurality of addresses in said selected one of said specified locations on said host interface by said linked display element.

* * * * *